UNITED STATES PATENT OFFICE.

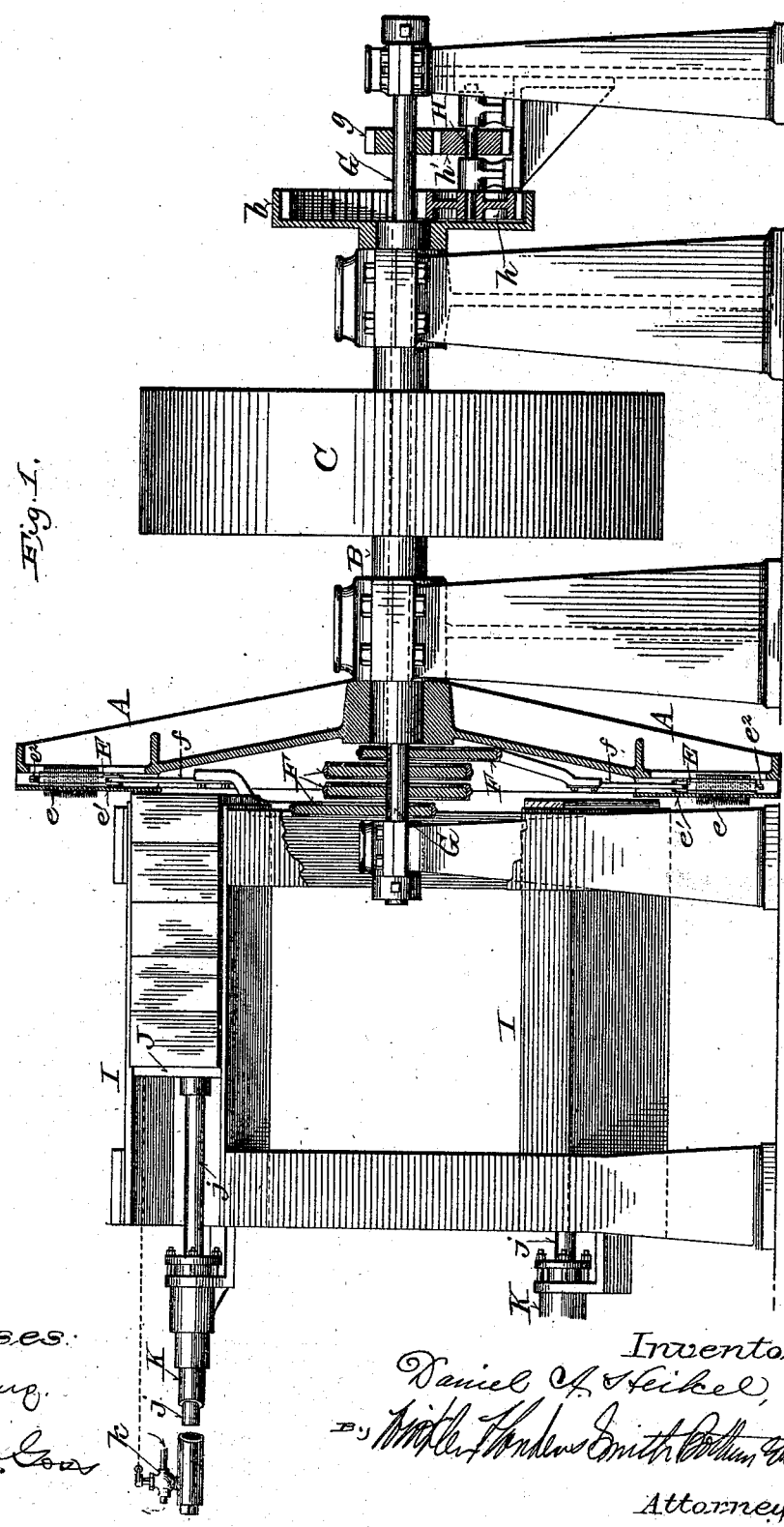

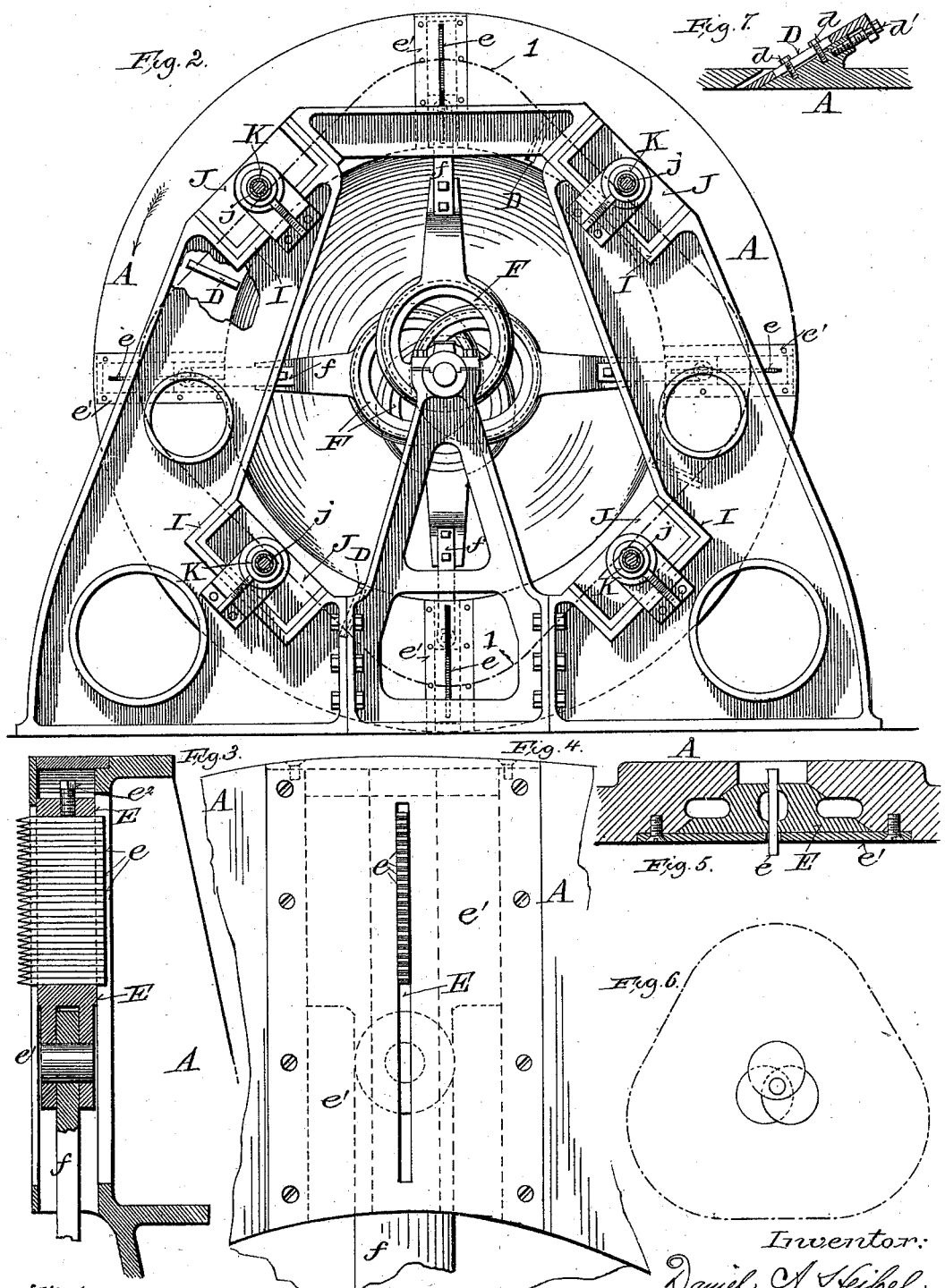

DANIEL A. HEIKEL, OF MILWAUKEE, WISCONSIN, ASSIGNOR TO BRUNO V. NORDBERG, OF SAME PLACE.

EXCELSIOR-MACHINE.

SPECIFICATION forming part of Letters Patent No. 554,267, dated February 11, 1896.

Application filed March 28, 1893. Serial No. 467,927. (No model.)

*To all whom it may concern:*

Be it known that I, DANIEL A. HEIKEL, of Milwaukee, in the county of Milwaukee and State of Wisconsin, have invented certain new and useful Improvements in Excelsior-Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to increase the speed and consequently the capacity of this class of machines, to cause the slitting or scoring cutters to follow or travel approximately parallel with the grain of the wood and thereby produce a better quality of excelsior, to reduce friction and wear and the power required to run the machine.

It consists essentially of a rotary cutter disk or plate provided with one or more stripping-cutters and one or more slitting or scoring cutters movable radially therein and arranged alternately with the stripping-cutters; one or more eccentrics mounted upon a separate shaft, capable of rotation in a different direction and at a different speed from that of the rotary cutter plate or disk and connected with said slitting or scoring cutter or cutters; one or more block holding and feeding boxes or conduits, each provided with a follower connected with and arranged to be moved forward therein by a piston, and of certain other novel features of construction and arrangement hereinafter particularly described, and pointed out in the claims.

In the accompanying drawings like letters designate the same parts in the several figures.

Figure 1 is a side elevation of a machine embodying my improvements, the rotary cutter plate or disk and the gearing connecting the shaft on which it is mounted with the eccentric-shaft being shown in vertical section. Fig. 2 is a front end elevation of the machine. Figs. 3, 4 and 5 are detail views, on an enlarged scale, of one of the slitting or scoring cutters and parts immediately associated therewith, Fig. 3 being a longitudinal section in a plane cutting the rotary cutter plate or disk radially; Fig. 4, a front elevation, and Fig. 5 a cross-section. Fig. 6 is a diagram illustrating the path described by the slitting-cutters in a three-block machine, and Fig. 7 is a detail sectional view of one of the stripping-cutters.

A represents the rotary cutter plate or disk, which may be conveniently cast of iron in circular form, with the outer portion in which the cutters are located projecting in front of the central portion, thereby providing a convenient space for the eccentrics by which the slitting-cutters are operated. It is mounted upon one end of a horizontal tubular shaft B, which is furnished with a pulley C for connecting the machine with a suitable driving-pulley. In its outward forwardly-projecting portion the plate or disk A is provided at suitable intervals with alternating shaving or stripping cutters D and alternating slitting or scoring cutters e.

Each of the slitting-cutters consists of a series of sharp-pointed knives $e\ e$, arranged and held together side by side in a slide E by a set-screw $e^2$, as shown in Figs. 1 and 3. The slides E are movable radially in recessed ways provided therefor in the rotary disk A, and are held in place therein by slotted plates or keepers $e'$, screwed to said disk over said recesses, the points of the slitting-cutters $e\ e$ projecting through the slots therein, as shown in Figs. 3, 4, and 5. The shaving or stripping cutters D may be made, substantially as shown in Fig. 7, approximately of the form of an ordinary plane-iron, with longitudinal slots therein, through which they are secured by screws $d\ d$ to inclined seats or bearing-faces formed therefor on the back side of the rotary disk A. They are formed at their rear ends with notched or perforated ears, in which adjusting-screws $d'$, threaded in the back of disk A, are swiveled for the purpose of advancing the cutters more or less as desired.

F F are eccentrics mounted upon the front end of a shaft G, which passes through the tubular shaft B and is supported at its projecting ends in suitable bearings. The eccentrics F are provided with straps, which are connected by rods $f\ f$ with the slides E E. Upon the rear end of shaft B is fixed an internal gear $b$, which engages with a pinion $h$, on a counter-shaft H, provided in turn with a pinion $h'$, working with a pinion $g$, fixed on the shaft G. Through this train of gears the eccentric-shaft is driven from the shaft B, but in the opposite direction and at a different rate of speed.

I I represent block-feeding boxes or conduits supported in a suitable frame perpendicularly to the front face of the cutter-disk A. They are made open on one side to permit of the insertion of the blocks therein, and are provided with followers J, movable lengthwise therein for the purpose of feeding the blocks to the rotary cutter-disk A to be operated upon by the cutters therein. Each follower J is attached to the end of a piston $j$, working in a cylinder K, which is provided at or near the front end with a three-way cock $k$, one port of which communicates with the cylinder, another with a steam or other suitable pressure generator, and the third with a vacuum-pump. (Not shown.) The stem of the cock $k$, provided with a lever or crank-arm, is connected by a cord or chain, as indicated by dotted lines in Fig. 1, with the follower J, so that when the said follower has reached the desired limit of its advance movement the cock will be shifted so as to shut off the steam or other actuating medium from the cylinder and establish communication between it and the vacuum-pump, whereby the piston and follower attached thereto will be withdrawn for the reception of another block or supply of blocks in the box I. When the box I has been replenished, the cock $k$ is turned by the operator to admit the actuating medium to the cylinder. The follower J is then moved forward by the piston $j$ and the blocks fed up to the working face of the cutter-disk A as they are reduced by the cutters D and $e$.

I have shown and described for the purpose of illustration a machine constructed and arranged to operate upon four blocks at once; but the principle of my invention is not limited in its application to that number.

In a four-block machine I provide the cutter-disk with four radially-movable slitting or scoring cutters and with four alternating shaving or stripping cutters, although the number of the stripping-cutters may be increased if desired. The path described by the slitting-cutters $e$ as the resultant of the rotary movement of the disk A and the action of the eccentrics F is indicated by the dotted line 1 1, Fig. 2, and it will be observed upon inspection of this figure that they pass the blocks in approximately straight lines parallel with the grain of the wood. In a four-block machine with four eccentrics and slitting-cutters connected therewith the desired movement of the slitting-cutters may be produced by running the eccentric-shaft at the rate of three revolutions to one revolution of the disk A in the opposite direction, or at the rate of five revolutions to one revolution of the disk A in the same direction. I prefer, however, to run the eccentric-shaft in the opposite direction to that of the disk A, because it can be run in that direction much slower, and consequently with less wear and strain upon the machine. With a three-block machine provided with three slitting-cutters operated by a corresponding number of eccentrics the path described by the slitting-cutters will correspond approximately with a triangle. (Illustrated in the diagram in Fig. 6.) In such a three-block machine the desired movement of the slitting-cutters may be produced by running the eccentric-shaft two revolutions to one revolution of the cutter-disk in the opposite direction, or at the rate of four revolutions to one revolution of the cutter-disk in the same direction.

It is obvious that the construction and arrangement of the gearing for driving the cutter-disk and operating the slitting-cutters, as well as other details of the machine, may be variously modified within the scope of my invention.

I claim—

1. In an excelsior-machine, the combination with a rotary cutter-disk of a slitting-cutter movable radially therein and an eccentric connected with said slitting-cutter and capable of rotation at a different rate of speed from that of said disk, substantially as and for the purposes set forth.

2. In an excelsior-machine, the combination of a rotary cutter-disk provided with slitting and stripping cutters, the slitting-cutters being radially movable with reference to said disk, and eccentrics severally connected with said slitting-cutters and mounted upon a shaft capable of rotation independently of said rotary disk, substantially as and for the purposes set forth.

3. In an excelsior-machine, the combination of a rotary cutter-disk provided with stripping-cutters and radially-movable slitting-cutters, and eccentrics connected with said slitting-cutters and mounted upon a separate shaft, which is connected with said disk by suitable gearing and rotated thereby in the opposite direction at a different rate of speed, substantially as and for the purposes set forth.

4. In an excelsior-machine, the combination with a rotary cutter-disk mounted upon a tubular shaft and provided with stripping-knives and radially-movable slitting-knives, a shaft inserted in and geared with said tubular shaft, and eccentrics mounted upon the last-mentioned shaft adjacent to said cutter-disk and connected with said slitting-cutters, substantially as and for the purposes set forth.

5. In an excelsior-machine, the combination of a rotary cutter-disk mounted upon a tubular shaft and provided with stripping-cutters and radially-movable slitting-cutters, a shaft passing through said tubular shaft and connected therewith by a train of gears constructed and arranged to turn it in the opposite direction at a different rate of speed, and eccentrics mounted upon the opposite projecting end of the inclosed shaft and connected with said slitting-cutters, substantially as and for the purposes set forth.

6. In an excelsior-machine, the combination of a rotary cutter-disk provided with radially-movable slitting-cutters, a shaft concentric therewith and capable of rotation in the opposite direction at a different rate of speed, and eccentrics mounted upon said shaft and connected with said slitting-cutters, substantially as and for the purposes set forth.

In testimony that I claim the foregoing as my own I affix my signature in presence of two witnesses.

DANIEL A. HEIKEL.

Witnesses:
   JOHN H. HURLEY,
   CHAS. L. GOSS.